UNITED STATES PATENT OFFICE 2,690,976

ASPHALT BLEND

John D. Bartleson, Cleveland, Harley F. Hardman, Wickliffe, and Margaret L. Sunday, Cleveland Heights, Ohio, assignors to The Standard Oil Company, Cleveland, Ohio, a corporation of Ohio No Drawing. Application December 3, 1949, Serial No. 131,051

7 Claims. (Cl. 106—273)

This invention relates to a blend of asphalt and reaction products prepared by reacting a phosphorus sulfide with a liquid olefin, and then reacting with a higher aliphatic amine; in some instances the initial reaction product may be reacted with steam before the amine reaction. The final reaction product is especially suitable as an additive for improving the characteristics of cut-back asphalts as well as asphalt cements.

Cut-back asphalt, such as the so-called medium curing (MC) type, is produced by fluxing the asphalt with a suitable solvent such as a naphtha or a similar hydrocarbon. The latter makes the asphalt more fluid and easier to apply for some uses. It may be applied in the cold or at room temperature, except in cut-back asphalt having a small amount of solvent which may be warmed. There are six grades of the medium curing type of cut-back asphalt, known as MC-0, MC-1, MC-2, MC-3, MC-4 and MC-5, containing different amounts of solvent. MC-0 for instance, contains about 50% solvent and MC-5 contains about 18% solvent. These various grades are used for applying to various surfaces, and in the case of road surfaces in the manner designated for the respective grades. MC-3 for example, is used as a binder in surface treatments, in road mix construction with open-graded or dense-graded aggregate, and in cold-patch mixtures in open-graded aggregate. The cut-back asphalts must be free from water and conform to certain ASTM requirements. (See for instance, ASTM 1944, pages 432-433.) As illustrative of a typical cut-back asphalt, the following is the analysis of the MC-3, which is described more particularly hereinafter:

| | |
|---|---|
| Viscosity at 140° F., Saybolt Furol | 434 |
| Specific gravity at 60° | 0.9548 |
| IBP °F | 438 |
| 45% °F | 500 |
| 74% °F | 600 |
| 78.5% °F | 680 |
| Penetration at 77° F. (on residue) | 171 |
| Crude source—Illinois. | |

Cut-back asphalts are used extensively as binders for stone aggregate. Some of the more important uses are (1) in bituminous premixed base in which the solvent reduces the viscosity of the asphalt so that it can be mixed and transported without heating, (2) in bituminous surface treatment where the cut-back asphalt is poured over old surfaces and the aggregate then applied over the asphalt and rolled, (3) in bituminous road mix in which the cut-back asphalt and the aggregate are mixed right in the road bed, and (4) in penetration macadam in which aggregate is applied to the road bed and the cut-back asphalt is poured over it so that it flows over the aggregate and seeps down through it. In all instances, the solvent evaporates leaving a waterproof coating adhering to the aggregate particles.

An important requirement of these asphalts is their adhesion to the aggregate or other surfaces in the presence of water. This is especially significant in the last three mentioned uses where it would be very possible that the aggregate would be wet at the time of use.

For this reason cut-back asphalt specifications require the cut-back asphalt to adhere successfully to wet aggregate. This is to be contrasted with the specifications for asphalt cement (which has no solvent) which is generally premixed with dry aggregate. For this reason the test for asphalt cement is made on dry aggregate and it is not as severe as the test on cut-back asphalt which must adhere to wet aggregate. Thus any additive that will cause an asphalt to adhere satisfactorily in the cut-back form will certainly cause it to adhere satisfactorily in the cement form. The opposite is not true and many additives are excellent in asphalt cement which are not satisfactory in cut-back asphalt. Thus when a reference is made to an additive in cut-back asphalt as performing satisfactorily it is assured without further test that it is suitable in an asphalt cement.

In testing additives for cut-back asphalt the Ohio State Highway Department Test Procedure, Section M-205.3, was used. In this test 100 grams of standard reference stone composed of 50% silica gravel and 50% crushed limestone, graded to pass a ⅜" sieve and to be retained on a ¼" sieve, is placed in an 8 oz. seamless ointment box and covered with distilled water. When MC-0, MC-1, MC-2 or MC-3 are to be tested, the water-covered aggregate is allowed to soak at room temperature for ½ hour. When MC-4 or MC-5 are to be tested, the water covered aggregate is placed in a constant temperature oven at 150° F. for ½ hour. Immediately after this soaking period, the excess water is poured from the aggregate, 5½ grams of the MC, heated to the temperature hereinafter specified, added to the wet aggregate, and mixed vigorously with the aggregate, using a spatula, for three minutes to make sure that each aggregate particle is completely coated. MC-0, MC-1, MC-2 and MC-3 are mixed at room temperature. MC-4 and MC-5 are heated to 150° F. and applied at that temperature. After coating, the mixture is spread thinly on a glass plate and allowed to cure at laboratory temperature for one hour. The mixture is then placed in water at room temperature for half an hour, after which time it is examined and the number of particles that show stripping is determined. All of the tests on cut-back asphalt described herein were made with MC-3 cut-back asphalt, containing an amount of an additive as indicated in the tests, and a successful additive must give 90% coating, preferably 95%.

It has been found, in accordance with the invention, that an economically desirable additive which can be added in small amounts to cut-back asphalt to cause it to pass the above test may be prepared by reacting a low cost olefin with phosphorus pentasulfide and then reacting with a higher aliphatic amine. Reaction of the initial reaction product with steam, before reaction with the amine, is desirable although not essential.

The objects achieved in accordance with the invention include the provision of an economically advantageous additive for use in cut-back asphalts and its preparation by reacting an olefin with a sulfide of phosphorus, reacting with steam as a preferred but optional step, and reacting with a higher aliphatic amine; the provision of economic cut-back asphalts of highest quality and their preparation by incorporating into a lower quality asphalt an amount to bring the adhesion of the asphalt in cut-back form up to the desired quality standard; of a reaction product prepared by reacting an olefin with a sulfide of phosphorus, optionally reacting with steam, and then reacting with a higher aliphatic amine, and other objects which will be apparent as details of embodiments of the invention are set forth hereinafter.

In general, olefins used in preparing the additive have from about 4 to about 25 carbon atoms in the molecule and these are preferred as an initial reaction component. A commercially desirable olefin is so-called "motor polymer" or species of this known as "heavy motor polymer" or "reduced motor polymer." Motor polymer, as this term is used, is an olefin polymer made from $C_3$ and $C_4$ olefins by polymerization, e. g., with a phosphorus acid type catalyst. It is a slightly fluorescent, light colored liquid. In its whole state it has an F-2 clear octane rating in the range of 75-85, and a typical motor gasoline boiling point range with the bulk of the products boiling off at between about 190° and 360° F., thus indicating that the bulk of the material is in the $C_8$-$C_{10}$ olefin boiling range with some lighter and heavier ends. The polymers appear, in general, to be fairly highly branched and contain substantial proportions of tertiary olefins. Little or no diolefins are present and it contains virtually no aromatic, naphthenic or paraffinic constituents. This is well known in the industry as "motor polymer" and need not be further defined to be fully understood by one skilled in the art.

A polymer gasoline fraction may be removed from such a motor polymer by fractional distillation to the 250° F. cut point, and the residue (I. B. P. of 250° F.) is known as "reduced motor polymer." The reduced motor polymer may contain small amounts of materials lighter than trimer, its average molecular weight is about 145, and it preferably contains a major amount of olefins boiling below 600° F. Other fractions having other initial boiling points (I. B. P.) are referred to as heavy motor polymer and are identified by their I. B. P. Olefins and olefin polymers made from other olefins and by other methods may be used.

The sulfide-olefin reaction may be carried out in the presence or absence of air, or in an atmosphere of inert, or non-deleterious gas, such as nitrogen or $H_2S$. It may also be carried out at atmospheric pressure or under superatmospheric pressure, e. g., the pressure generated when the reaction is carried out in a closed vessel or the pressure due to an added inert gas.

Water within the range of 0 to 10% may be present, preferably about 3 to 6%, if water is employed. The yield is very high. Generally, the amount of phosphorus pentasulfide is chosen so that all of it will react at the temperature selected and the reaction is continued until it is consumed. In general, about 0.25 to 0.75 mol of phosphorus pentasulfide are used per mol of olefin. The preferred ratio is about 0.5:1.0. The temperature for the reaction is selected so that it proceeds at such a rate as to complete the reaction in a reasonable time. Generally, the temperature is within the range of 150° to 425° F., the lower temperatures requiring much longer reaction times. The preferred temperature range is 280° to 350° F.

The phosphorus pentasulfide-olefin reaction product may be made with direct admixture of the reactants, or, if desired, by their admixture in the presence of a diluent which may or may not be subsequently removed.

The reaction is usually complete in about 10 hours or less time, except in the case of temperatures in the lower part of the range. The reaction time is a function of the temperature, the pressure, the amount of the phosphorus pentasulfide that is to react, the subdivision of the reactants, the rate of stirring, etc.

After the reaction is complete, the sulfide-olefin reaction product may be used in the next step. However, if there is any sludge, it may be centrifuged or filtered to remove any traces of insoluble by-product substances.

If the reaction product is reacted with steam before reaction with the amine, this is preferably carried out at a temperature within the range of 212° to 300° F. preferably 215° to 260° F., and is continued until the desired product is obtained, generally from ½ to 48 hours depending somewhat on the rate of the reaction with steam. This reaction is believed to be one of hydrolysis in which oxygen replaces sulfur with the elimination of sulfur as $H_2S$. It is carried out conveniently by passing steam through the reaction product at an elevated temperature.

The amine derivative of the reaction product is prepared by mixing the two ingredients, at room temperature, or above, preferably at a temperature of about 200° F. in order to shorten the reaction.

One object of the invention is to select an optimum within the several variables which will give an additive that produces the best results in the smallest amount. The conditions under which the initial reaction is carried out, and the reaction with steam if this is done, are not regarded as critical variables. In general the steam reacted product is more effective, all other variables being equal.

The amine should be a higher aliphatic hydrocarbon amine, i. e. contain 8 to 24 carbon atoms.

Amines having aliphatic hydrocarbon chains of 10 to 12 carbon atoms, e. g., decylamine, dodecylamine, and commercial or technical amines composed largely of these amines, give optimum results in the case of an additive for cut-back asphalt. A commercially desirable amine is that made from the coconut oil fatty acid mixture, and is sometimes called cocoamine. It is a mixture of amines having alkyl radicals in proportion to their natural occurrence in coconut oil, predominantly 12 and 14 carbon atoms. It is sold under the trade name "Armeen-C." With the less costly technical grade of cocoamine, a slightly higher concentration of the additive is required, than in the case of the pure amines having optimum chain length.

The cocoamine itself is not suitable as an additive for improving the coating properties of the above asphalt when incorporated in an amount equivalent to the amine content of the amine in the olefin-sulfide reaction product, as will be seen from the data presented hereinafter.

The amount of the amine, in the case of an additive for cut-back asphalt, may be from 0.1 to 1.5 equivalents of the theoretical amount required based on the neutralization number of the reaction product, (with or without the reaction with steam) 0.6 to 1.2 mols being optimum.

The following is illustrative of the preparation of the initial reaction product and the reaction with steam.

EXAMPLE A

In a typical reaction of the olefin and the sulfide, 60 pounds of reduced motor polymer, 38% of phosphorus pentasulfide and 2.4 pounds of water were mixed and heated in a closed vessel. The temperature reached 350° F. in one hour and it was maintained at this temperature for 3 hours, with agitation. The reaction mass was then filtered hot from a sludge amounting to about 10%. The resulting product had the following properties:

3.9 weight percent pentane insolubles, a viscosity at 100° F. of 167 cs. (centistokes), 25.2% sulfur, 8.4% phosphorus, a molecular weight of 333, a neutralization number of 45, a saponification number of 212, and a density of 1.0505, and an optical density of 321.

EXAMPLE B

A portion of the above $P_2S_5$ motor polymer reaction product from Example A was reacted with steam at a temperature of 230° F., for two hours. The residue was 70.6 weight percent of the charge. This residue had the following characteristics:

32.2 weight percent pentane insolubles, a viscosity at 100° F. of 5,370 cs. or 24,800 SUS, 21.0 weight percent sulfur, 11.9 weight percent phosphorus, a neutralization number of 147, and a density of 1.1112.

The above initial reaction products were reacted with various amines in different amounts as shown in the following table and tested in different amounts in MC-3 cut-back asphalt by the test described with the results as shown below.

*Table I*

| Example No. | Initial Reaction Product of Example | Amine | Amount of Amine in Equivalents | Amount Added to Cut-back Asphalt | Amount of Aggregate Coated |
|---|---|---|---|---|---|
|  |  |  |  | *Percent* | *Percent* |
| 1 | A | octylamine | 1.0 | 2.0 | 93 |
| 2 | A | decylamine | 1.0 | 2.0 | 100 |
| 3 | A | dodecylamine | 1.0 | 2.0 | 100 |
| 4 | A | do | 0.5 | 2.0 | 98 |
| 5 | A | octadecylamine | 1.0 | 2.0 | 91 |
| 6 | A | Armeen-S | 1.0 | 2.0 | 97 |
| 7 | B | octylamine | 0.2 | 2.0 | 91 |
| 8 | B | decylamine | 0.2 | 2.0 | 96 |
| 9 | B | dodecylamine | 0.2 | 2.0 | 93 |
| 10 | B | cocoamine | 0.8 | 0.8 | 98 |
| 11 | B | do | 1.0 | 0.8 | 99 |
| 12 | B | do | 1.2 | 0.8 | 91 |
| 13 | B | do | 1.0 | 1.0 | 96.5 |
| C | None | do |  | [1] 0.32 | 30 |

[1] This amount is approximately equivalent to the amount of amine present in the asphalt in Example 11.

The above tests show the suitability of the additive in cut-back asphalt. The amount of the additive to be used in cut-back asphalt will be in the range of 0.1 to 10%. Generally about 1% is desirable and amounts over 2% are usually uneconomical.

When the additive is used in asphalt cement, the adherence of the asphalt may be tested by one of the following tests:

100 gms. of standard reference stone composed of 50 percent silica gravel and 50 percent crushed limestone, graded to pass a ⅜" sieve and be retained on a ¼" sieve, is dried one-half hour at 275° F. and coated with 5 gms. of asphalt by mixing it with a spatula for 3 minutes. The mixture is spread thinly on a plate and allowed to cure at a laboratory temperature for 1 hour. The mixture is then immersed in distilled water at 180° F. for one-half hour, after which the number of particles showing stripping is determined.

This test is referred to hereinafter as the Ohio test, and in order to pass the test the material must show a coating of at least 95%; i. e. a stripping of not over 5% of the aggregate particles.

MISSOURI BOIL TEST

Coating of the aggregate is carried out exactly as for the Ohio M-205.1 test and the same aggregate is used. After curing 1 hour at laboratory temperature, the mixture is immersed in hot distilled water, brought to a vigorous boil and boiled for 1 minute, and then examined for stripping.

MODIFIED WASH TEST

The same aggregate is used as in the Ohio M-205.1 test, as well as the same coating procedure. After curing at room temperature for 1 hour, the mixture is immersed in distilled water at room temperature and shaken vigorously for 15 minutes, and then examined for stripping. If no stripping occurs, the temperature is increased to 100° and shaking for 15 minutes repeated. The procedure is repeated, increasing the temperature by 20° F. intervals until appreciable stripping occurs.

30-MINUTE BOIL TEST

This is the same as the above Ohio test, except that the water is maintained at boiling temperature for 30 minutes, instead of at 180° F.

IMMERSION-COMPRESSION TEST

The ⅜"–¼" standard limestone and silica aggregates specified for the Ohio M-205.1 test are crushed to the following screen analyses (U. S. Sieve Series):

|  | Limestone, percent | Silica, percent |
|---|---|---|
| On 2.5 mesh | 0.0 | 0.0 |
| On 4 mesh | 7.0 | 7.3 |
| On 6 mesh | 24.0 | 32.0 |
| On 80 mesh | 55.7 | 57.5 |
| On 200 mesh | 4.5 | 2.5 |
| Through 200 mesh | 7.0 | 0.8 |

These aggregates are then made up into cylindrical specimens containing 5 percent by weight of asphalt in accordance with the method being considered as a tentative standard by Sub-Committee B-22 of Committee D-4 of A. S. T. M. Half the specimens were tested for compression strength immediately and the other half after 4 days' immersion in water at 120° F. Results are expressed as percent loss in compression strength based on the unsoaked specimens.

Another important property of an asphalt is its resistance to oxidative deterioration. The following tests are suitable for determining this property.

AIR BLOWN OXIDATION TEST—400° F.

150 gm. samples of the various asphalts were blown at 400° F. with 0.04 ft.³/min. of air for 135 minutes in the Sohio lubricating oil oxidation test procedure (described in U. S. Pat. 2,403,894). Penetrations, ductilities, and softening points of the oxidized asphalts were then determined.

THIN FILM OVEN TEST

Reference is made to R. H. Lewis and J. Y. Welbron, Proc. Assoc. Asphalt Paving Technologists 12, 14 (December 1940). For this test 50 ml. of asphalt is weighed into a flat bottom container 5.5" I. D. so as to obtain a film thickness of ⅛". Other than the container size the conditions are those of the A. S. T. M. test D6-39T for loss on heating (5 hours at 325° F.). Penetrations, ductilities, and softening points are determined on the residue.

SHELL OXIDATION TEST

Reference is made to Ind. Eng. Chem. Anal. Ed. 14, 45 (1942). The procedure differs from that originally described only in that the bomb used is that for the A. S. T. M. Oxidation Stability of Gasoline, Designation D525-46. 100 gm. of asphalt are dissolved in 67 gm. of benzene, placed in the bomb under 100 p. s. i. g. of oxygen, the bomb then inserted into a water bath at 120° F., and the pressure recorded as a function of time. The asphalt is then recovered from solution and its penetration measured. The oxidation rating is the product of the pressure drop at 40 hours and the slope of the tangent at 40 hours on the curve of pressure drop versus time. The larger the oxidation rating the more oxygen has been consumed. To obtain the hardening rating, the curve of log penetration versus pressure drop for 3 or more samples is extrapolated to obtain the pressure drop necessary to reach 20 penetration (A. S. T. M. units). The larger the hardening rate the more oxygen will be required for a given reduction in penetration. The deterioration index is obtained by (oxidation rating/hardening rating) ×100, and smaller values indicate better oxidation resistance.

SOHIO TEST METHOD A-2-1146T

Reference is made to Ebberts, Ind. Eng. Chem. 34, 1408 (1942). This test involves determining the number of milliliters of 0.1 normal $KMnO_4$ solution consumed by a standard film of the asphalt during 1 hour at 140° F. Some correlation with service performance of asphalts has been reported. The smaller the quantity of $KMnO_4$ consumed, the more resistant to oxidation the asphalt is said to be.

The product of Example 11, namely one equivalent of cocoamine reacted with the reaction product of Example B at 200° F. was tested and the results will now be described.

The following data indicate typical test results using a 70/80 penetration asphalt from a Mid-Continent crude when tested by the Ohio test:

*Table II*

| Conc. of Additive | Percent Aggregate Coated | |
|---|---|---|
| | Ohio Test | 30-Min. Boil Test |
| 0.75% | 100 | 100 |
| 0.50% | 100 | 100 |
| 0.40% | 100 | 80 |
| 0.25% | 95 | 75 |

These data clearly show that the additive of the invention is effective in small amounts in asphalt cement when tested by the Ohio test and the 30-minute boil test.

The following different tests also indicate advantages of the additive of the invention using a petroleum 70/80 pen. asphalt from Mid-Continent crude; the values indicate the percent of the number of particles (Ohio test aggregate) which show stripping.

*Table III*

| Amount of Additive | Ohio M-205.1, Percent Stripped | Missouri Boil, Percent Stripped | Modified Wash Test | | 30 Min. Boil, Percent Stripped |
|---|---|---|---|---|---|
| | | | Percent Stripped | Temp., degrees | |
| None | 80 | 50 | 20 | 77 | |
| 1.0% | 0 | 0 | 0 | 200 | 0 |

The following different tests also indicate advantages of the additive of the invention using a petroleum 70/80 pen. asphalt from a Mississippi crude; the values indicate the percent of the number of particles which show stripping.

Table IV

| Amount of Additive | Ohio M-205.1, Percent Stripped | Missouri Boil, Percent Stripped | Modified Wash Test | |
|---|---|---|---|---|
| | | | Percent Stripped | Temp., degrees |
| None | 65 | 25 | 15 | 77 |
| 1.0% | 0 | 0 | 0 | 200 |

The additive of the invention, as shown in Tables III and IV, is very effective in preventing stripping of asphalt cement as would be expected from the results obtained with the additive in cut-back asphalt.

The above 70/80 pen. petroleum asphalt, from Mid-Continent crude and a blend thereof containing the additive was subjected to the immersion-compression test and the following results are typical:

Table V

| Amount of Additive | Limestone | | Silica | |
|---|---|---|---|---|
| | Percent Voids in Specimen | Percent Loss in Comp. Strength | Percent Voids in Specimen | Percent Loss in Comp. Strength |
| None | 16.8 | 42.9 | 18.9 | 9.5 |
| 1.0% | 13.8 | 33.7 | 18.5 | 0.0 |

A 70/80 pen. petroleum asphalt from a Mississippi crude and a blend thereof containing the additive were subjected to the immersion-compression tests, and the following results are typical:

Table VI

| Amount of Additive | Limestone | | Silica | |
|---|---|---|---|---|
| | Percent Voids in Specimen | Percent Loss in Comp. Strength | Percent Voids in Specimen | Percent Loss in Comp. Strength |
| None | 15.1 | 46.8 | 17.7 | 15.5 |
| 1.0% | 14.3 | 33.3 | 15.6 | 0.0 |

Tables IV and V indicate that the additive of the invention is effective when tested by this test in different asphalts on different aggregates.

A 70/80 pen. petroleum asphalt from a Mid-Continent crude and a blend thereof containing the additive were subjected to oxidation tests, and the following results are typical:

Table VII

| Amount of Additive | None | 1% |
|---|---|---|
| Air Blown Oxidation—400° F.: | | |
| Pen. 77° F. 100 G—5 sec | 42 | 49 |
| Duct. 77°—5 cm./min | 69 | 100+ |
| 60°—5 cm./min | 8 | 12 |
| R. & B. Soft. Point, °F | 132 | 134 |
| Thin Film Oven Test—325° F.: | | |
| Pen. 77°—100 Gm.—5 sec | 30 | 45 |
| Duct. 77°—5 cm./min | 22 | 69 |
| 60°—5 cm./min | 7.5 | 11.5 |
| R. & B. Soft. Point, °F | 149 | 132.5 |
| Original Properties of Asphalts: | | |
| Pen. 77°—100 Gm.—5 sec | 71 | 83 |
| Duct. 77°—5 cm./min | 100+ | 100+ |
| 60°—5 cm./min | 67 | 100+ |
| R. & B. Soft. Point °F | 122.5 | 114 |

A 70/80 pen. petroleum asphalt from a Mississippi crude and a blend thereof containing the additives were subjected to oxidation tests, and the following results are typical:

Table VIII

| Amount of Additive | None | 1% |
|---|---|---|
| Air Blown Oxidation—400° F.: | | |
| Pen. 77°—100 G—5 sec | 44 | 49.5 |
| Duct. 77°—5 cm./min | 65 | 68 |
| 60°—5 cm./min | 7.5 | 8.5 |
| R. & B. Soft. Point, °F | 140 | 139 |
| Thin Film Oven Test—325° F.: | | |
| Pen. 77°—100 Gm.—5 sec | 35 | 46.5 |
| Duct. 77°—5 cm./min | 18 | 27 |
| 60°—5 cm./min | 5.5 | 7 |
| R. & B. Soft. Point, °F | 146 | 138.5 |
| Original Properties of Asphalts: | | |
| Pen. 77°—100 Gm.—5 sec | 72 | 77 |
| Duct. 77°—5 cm./min | 100+ | 100+ |
| 60°—5 cm./min | 38 | 50 |
| R. & B. Soft. Point, °F | 126 | 118 |

In the air blown test, the penetrations and ductilities of the oxidized treated asphalts are higher than those of the untreated asphalts of Tables VII and VIII, indicating that the cocoamine derivative additive has anti-oxidant properties.

A 70/80 pen. petroleum asphalt from a Mid-Continent crude and a blend thereof containing the additives were also subjected to the other oxidation tests, and the following results are typical:

Table IX

| Amount of Additive | Sohio A-2-1146T cc. 0.1 N $KMnO_4$ | Hardening Rating | Oxidation Rating | Deterioration Index |
|---|---|---|---|---|
| None | 2.27 | 160 | 42.5 | 26.6 |
| 1% | 1.31 | 176 | 25.7 | 14.6 |

A 70/80 pen. petroleum asphalt from a Mississippi crude and a blend thereof containing the additives were also subjected to the other oxidation tests, and the following results are typical:

Table X

| Amount of Additive | Sohio A-2-1146T cc. 0.1 N $KMnO_4$ | Hardening Rating | Oxidation Rating | Deterioration Index |
|---|---|---|---|---|
| None | 1.60 | 98 | 28.6 | 29.2 |
| 1% | 1.17 | 139 | 20.7 | 14.9 |

These data show that the additive of the invention has an anti-oxidant effect.

The independence of the penetration characteristic of the asphalt, upon its adhesion characteristic when using the additive of the invention is indicated in the following Ohio test data, using a petroleum asphalt from a Mid-Continent crude:

Table XI
OHIO TEST

| Penetration of Asphalt | Percent Coated | |
|---|---|---|
| | No Additive | 0.5% Additive |
| 20 Pen | 95 | 100 |
| 63 Pen | 65 | 100 |
| 115 Pen | 65 | 100 |
| 200 Pen | 82 | 100 |

The effect of the additives of the invention in improving the adhesion property of commercial asphalts from various sources is indicated in the following Ohio test data; the values being weight percent of the additive required for 100% coating:

Table XII

| Asphalt | Percent Coated, No Additive | Percent Add. for 100% Coating |
|---|---|---|
| California | 25 | 0.8 |
| Illinois | 94 | 0.05 |
| Low Ductility | 80 | 0.2 |
| Kansas Cracked | 82 | 0.75 |
| Smackover | 87 | 0.1 |
| Venezuelan | 85 | 0.1 |
| Kansas | 70 | 0.25 |
| California | 70 | 0.5 |
| Wyoming | 95 | 0.1 |

These data indicate that the additive of the invention is an effective agent for improving the coating property of asphalts. In all cases, the amount of the additive of the invention required to give 100% coating, is less than 1%. Any amount may be used depending on the improvement desired in the asphalt cement. The amount usually will fall within the range of 0.01% to 1%, generally about 0.1 to 0.5%.

The initial reaction products of Examples A and B were reacted with various amines in different amounts, as shown in the following table, and were tested in asphalt cement by the Ohio test with the results as shown below:

Table XIII

| Example No. | Initial Reaction Product of Example No. | Amine | Amount of Amine in Equivalents | Amount Added to Asphalt Cement | Amount of Aggregate Coated |
|---|---|---|---|---|---|
| | | | | Percent | Percent |
| 14 | A | Amylamine | 1.0 | 0.5 | 100 |
| 15 | A | Octadecylamine | 0.5 | 0.5 | 96.5 |
| 16 | B | Octylamine | 0.1 | 0.25 | 97 |

A comparison of Tables I and XIII will show that the amine chain length and the amount of the amine reacted are not as significant when the additive is for use in asphalt cement as in the case of cut-back asphalt. An amine having from 5 to 18 carbon atoms may be used with relatively equivalent results in asphalt cement. The amount is not as important as is shown in the above table, and this will be apparent from a consideration of the fact that the reaction product before the amine reaction is suitable as an additive for asphalt cement, although somewhat larger amounts are usually required.

It is obvious that my invention is capable of variations within the general teaching, and all such variations and equivalents are to be included as fall within the following claims.

We claim:

1. An asphalt blend comprising a major proportion of an asphalt which does not adhere satisfactorily to aggregate and an amount within the range of 0.01% to 1% to improve the adhesion characteristic of said asphalt of the product of reacting a liquid olefin with phosphorus pentasulfide in the proportions of about 0.25 to 0.75 mol of phosphorus pentasulfide per mol of olefin at a temperature within the range of 150° to 425° F., and then reacting with a higher aliphatic hydrocarbon amine in the proportions of about 0.1 to 1.5 equivalents per saponification equivalent of said reaction product.

2. An asphalt blend comprising a major proportion of an asphalt which does not adhere satisfactorily to aggregate and an amount within the range of 0.01% to 1% to improve the adhesion characteristic of said asphalt of the product of reacting a liquid olefin "motor polymer" with phosphorus pentasulfide in the proportions of about 0.25 to 0.75 mol of phosphorus pentasulfide per mol of motor polymer at a temperature within the range of 150° to 425° F., and then reacting with a higher aliphatic hydrocarbon amine in the proportions of about 0.1 to 1.5 equivalents per saponification equivalent of said reaction product.

3. An asphalt blend comprising a major proportion of an asphalt which does not adhere satisfactorily to aggregate and an amount within the range of 0.01% to 1% to improve the adhesion characteristic of said asphalt of the product of reacting a liquid olefin with phosphorus pentasulfide in the proportions of about 0.25 to 0.75 mol of phosphorus pentasulfide per mol of olefin at a temperature within the range of 150° to 425° F., reacting with steam, and then reacting with a higher aliphatic hydrocarbon amine in the proportions of about 0.1 to 1.5 equivalents per saponification equivalent of said reaction product.

4. A cut-back asphalt blend comprising a major proportion of a cut-back asphalt which does not adhere satisfactorily to aggregate and an amount within the range of 0.1% to 10% to improve the adhesion characteristic of said asphalt of the product of reacting a liquid olefin with phosphorus pentasulfide in the proportions of about 0.25 to 0.75 mol of phosphorus pentasulfide per mol of olefin at a temperature within the range of 150° to 425° F., and then reacting with a higher aliphatic hydrocarbon amine in the proportions of about 0.1 to 1.5 equivalents per saponification equivalent of said reaction product.

5. A cut-back asphalt blend comprising a major proportion of a cut-back asphalt which does not adhere satisfactorily to aggregate and an amount within the range of 0.1% to 10% to improve the adhesion characteristic of said asphalt of the product of reacting a liquid olefin "motor polymer" with phosphorus pentasulfide in the proportions of about 0.25 to 0.75 mol of phosphorus pentasulfide per mol of "motor polymer" at a temperature within the range of 150° to 425° F., and then reacting with a higher aliphatic hydrocarbon amine in the proportions of about 0.1 to 1.5 equivalents per saponification equivalent of said reaction product.

6. A cut-back asphalt blend comprising a major proportion of a cut-back asphalt which does not adhere satisfactorily to aggregate and an amount within the range of 0.1% to 10% to improve the adhesion characteristic of said asphalt of the product of reacting a liquid olefin "motor polymer" with phosphorus pentasulfide in the proportions of about 0.25 to 0.75 mol of phosphorus pentasulfide per mole of motor polymer at a temperature within the range of 150° to 425° F., and then reacting with an aliphatic hydrocarbon amine having 10 to 12 carbon atoms in the proportions of about 0.1 to 1.5 equivalents per saponification equivalent of said reaction product.

7. A cut-back asphalt blend comprising a major proportion of a cut-back asphalt which does not adhere satisfactorily to aggregate and an amount within the range of 0.1% to 10% to improve the adhesion characteristic of said asphalt of the product of reacting a liquid olefin "motor polymer" with phosphorus pentasulfide in the proportions of about 0.25 to 0.75 mol of phosphorus pentasulfide per mol of motor polymer at a temperature within the range of 150° to 425° F., reacting with steam, and then reacting with an aliphatic hydrocarbon amine having 10 to 12 carbon atoms in the proportions of about 0.1 to 1.5 equivalents per saponification equivalent of said reaction product.

References Cited in the file of this patent

UNITED STATES PATENTS

| Number | Name | Date |
| --- | --- | --- |
| 2,316,087 | Gaynor et al. | Apr. 6, 1943 |
| 2,316,090 | Kelso | Apr. 6, 1943 |
| 2,403,474 | Bartleson et al. | July 9, 1946 |
| 2,409,799 | Roberts | Oct. 22, 1946 |
| 2,412,633 | Schwartz | Dec. 17, 1946 |
| 2,424,402 | Loane | July 22, 1947 |
| 2,495,478 | Redman | Jan. 24, 1950 |